United States Patent [19]

Itomitsu et al.

[11] Patent Number: 5,440,704
[45] Date of Patent: Aug. 8, 1995

[54] DATA PROCESSOR HAVING BRANCH PREDICTING FUNCTION

[75] Inventors: Fujio Itomitsu; Toyohiko Yoshida, both of Hyogo, Japan

[73] Assignee: Mitsubishi Denki Kabushiki Kaisha, Tokyo, Japan

[21] Appl. No.: 340,462

[22] Filed: Nov. 14, 1994

Related U.S. Application Data

[63] Continuation of Ser. No. 866,289, Apr. 13, 1992, abandoned, which is a continuation of Ser. No. 549,302, Jul. 9, 1990, abandoned, which is a continuation-in-part of Ser. No. 89,557, Aug. 26, 1987, abandoned.

[30] Foreign Application Priority Data

Aug. 26, 1986 [JP] Japan .................................. 61-200557
Aug. 29, 1986 [JP] Japan .................................. 61-204500

[51] Int. Cl.⁶ ................................................ G06F 9/26
[52] U.S. Cl. ............................... 395/375; 364/261.3; 364/261.4; 364/261.5; 364/261.7; 364/DIG. 1
[58] Field of Search ................. 395/375; 364/200, 900

[56] References Cited

U.S. PATENT DOCUMENTS

| | | | |
|---|---|---|---|
| 3,577,189 | 5/1971 | Cocke et al. | 364/200 |
| 3,940,741 | 2/1976 | Horikoshi | 364/200 |
| 4,370,711 | 1/1983 | Smith | 364/200 |
| 4,430,706 | 2/1984 | Sand | 364/200 |
| 4,435,756 | 3/1984 | Potash | 364/200 |
| 4,439,827 | 5/1984 | Wilkes | 364/200 |
| 4,471,483 | 9/1984 | Matsumoto et al. | 364/200 |
| 4,477,872 | 10/1984 | Lasq et al. | 364/200 |
| 4,604,691 | 8/1986 | Akagi | 364/200 |
| 4,679,141 | 7/1987 | Pomerene et al. | 364/200 |
| 4,760,520 | 7/1988 | Shintani et al. | 364/200 |
| 4,763,245 | 8/1988 | Emma et al. | 364/200 |
| 4,764,861 | 8/1988 | Shibuya | 364/200 |
| 4,777,587 | 10/1988 | Case et al. | 364/200 |
| 4,777,594 | 10/1988 | Jones et al. | 364/200 |
| 4,847,753 | 7/1989 | Matsuo et al. | 364/200 |
| 4,853,840 | 8/1989 | Shibuya | 364/200 |
| 4,912,635 | 3/1990 | Nishimukai et al. | 364/200 |
| 4,984,154 | 1/1991 | Hanatani et al. | 364/200 |
| 4,991,080 | 2/1991 | Emma et al. | 364/200 |
| 5,051,896 | 9/1991 | Lee et al. | 364/200 |

*Primary Examiner*—Christopher B. Shin
*Attorney, Agent, or Firm*—Lowe, Price, LeBlanc & Becker

[57] ABSTRACT

An instruction loaded in an instruction register is decoded by an instruction decoder and the branch predicting bit which indicates whether the instruction is branched or not is read out from a branch predicting mechanism. If it is determined that the instruction is a conditional branch instruction as a result of decoding and the instruction is branched as a result of branch prediction, an instruction length and a branch displacement are replaced with each other by a selector, the branch displacement is added to a decoding program counter, and an address of the branch target destination is designated. On the other hand, in an object computer, the branch displacement of the conditional branch instruction is replaced with the instruction length of the conditional branch instruction, the branch condition is inverted, and the changed conditional branch instruction is executed. If the original branch prediction that a branch would occur with respect to the conditional branch instruction was wrong, the changed conditional branch instruction is executed in the object computer and branched, so that an instruction located subsequently to the conditional branch instruction on the program can be fetched particularly without requiring a mechanism for fetching again the instruction.

14 Claims, 5 Drawing Sheets a : ADDRESS OF THE CONDITIONAL BRANCH INSTRUCTION b : BRANCH DISPLACEMENT c : INSTRUCTION LENGTH

FIG.5

| | UNCONDITIONAL BRANCH INSTRUCTION | CONDITONAL BRANCH INSTRUCTION IN WHICH A BRANCH IS PREDICTED | NON-BRANCH INSTRUCTION | CONDITIONAL BRANCH INSTRUCTION IN WHICH A BRANCH IS NOT PREDICTED |
|---|---|---|---|---|
| SELECTOR 12 | REGISTER 11 | REGISTER 11 | REGISTER 10 | REGISTER 10 |
| SELECTOR 15 | REGISTER 13 | REGISTER 14 | REGISTER 14 | REGISTER 13 |
| SELECTOR 9 | | INVERTER 8 | | LEAST SIGNIFICANT BIT OF THE REGISTER 7 |

DATA PROCESSOR HAVING BRANCH PREDICTING FUNCTION

This application is a continuation of Ser. No. 07/866,289 filed Apr. 13, 1992, abandoned, which is a continuation of Ser. No. 07/549,302 filed Jul. 9, 1990 abandoned, which is a continuation-in-part application of U.S. application Ser. No. 07/089,557 filed on Aug. 26, 1987, abandoned.

BACKGROUND OF THE INVENTION

1. Field of the Invention

The present invention relates generally to a data processor having a branch predicting function and more particularly, to a data processor having a pipeline mechanism and a branch predicting function for predicting whether an instruction will be branched or not at the time of decoding.

2. Description of the Background Art

Instructions of the computer include a non-branch instruction, an unconditional branch instruction and a conditional branch instruction. The conditional branch instruction is an instruction which causes a branch when a certain condition is satisfied, which instruction constitutes a barrier to speeding up of the computer of a pipeline system. Therefore, a branch predicting system for predicting whether a branch will occur or not when the conditional branch instruction is applied is used. Such a branch predicting method is described in "COMPUTER", January 1984. issued by IEEE COMPUTER SOCIETY.

FIG. 1 is a schematic block diagram showing a conventional data processor having a branch predicting function. Referring now to FIG. 1, description is made on a structure of the conventional data processor having a branch predicting function. An instruction register 1 stores an instruction outputted to a data bus. The instruction stored in the instruction register 1 is applied to an instruction decoder 2. The instruction decoder 2 decodes the instruction and outputs an operation instructing signal, a signal indicative of a branch displacement (if the instruction is a conditional branch instruction or an unconditional branch instruction), and a signal indicative of an instruction length of the decoded instruction. An object computer 3 executes the instruction in response to the operation instructing signal outputted as a result of decoding of the instruction by the instruction decoder.

A branch predicting mechanism 4 stores a branch predicting bit corresponding to an address of the instruction. The branch predicting bit predicts whether a branch will occur or not when the instruction is executed. When the instruction is decoded, the branch predicting mechanism 4 reads out the branch predicting bit from an address corresponding to the instruction and applies the branch predicting bit to a comparator 5 and a next fetch instruction addressing portion 6. If a prebranch operation predicting that a branch will occur, is performed, the comparator 5 compares the result predicted in response to the branch predicting bit with the result of execution, by the object computer 3, of conditional branch instruction in which a branch is predicted, and applies a branch prediction failure signal to the next fetch instruction addressing portion 6 when the results do not coincide with each other.

When a failure in branch prediction is determined by the comparator 5, the next fetch instruction addressing portion 6 reads out an instruction in a correct direction from a memory in response to the branch prediction failure signal. The next fetch instruction addressing portion 6 includes an adder 61, a decoding program counter 62 and a save register 63. The adder 61 adds the instruction length to the contents of the decoding program counter 62 every time an instruction is executed, and outputs an address signal of a next instruction to be fetched. In the next fetch instruction addressing portion 6, address data of the decoding program counter 62 is saved in the save register 63 when the branch predicting bit is applied from the branch predicting mechanism, and the branch displacement is added to the address data counted by the decoding program counter 62 by the adder 61.

The address data in the decoding program counter 62 is saved in the save register 63, in order to load again to the saved address data to the decoding program counter 62, add the instruction length to the address data and fetch an instruction in the next address, when the branch prediction fails.

FIG. 2 is a diagram for explaining a branch predicting function. Referring now to FIGS. 1 and 2, description is made on a branch predicting method when the conventional conditional branch instruction is applied. The address data in the decoding program counter 62 is outputted to an address bus as an address signal, and an instruction is read out from a certain address in a memory (not shown) and loaded into the instruction register 1. The instruction is decoded by the decoder 2, so that the operation instructing signal and the instruction length are outputted. The object computer 3 performs processing operation in response to the operation instructing signal.

The adder 61 adds the instruction length decoded by the instruction decoder 2 to the contents of the decoding program counter 62 and then, outputs an address signal of the instruction to be next fetched to the address bus. The address signal outputted from the decoding program counter 62 corresponds to the conditional branch instruction, so that the branch predicting bit stored corresponding to a part of the address is read out and applied to the next fetch instruction addressing portion 6. If and when it is predicted that the instruction will be branched and it is determined that the instruction is a conditional branch instruction as a result of decoding, the next fetch instruction addressing portion 6 determines that the instruction is branched, so that the contents of the decoding program counter 62 are saved in the save register. The adder 61 adds the branch displacement decoded by the instruction decoder 2 to the contents of the decoding program counter 62. More specifically, as shown in FIG. 2, a branch displacement b is added to an address a of the conditional branch instruction, so that an address signal indicating an address a+b of the destination to be branched is outputted. Instruction of the destination to be branched is read out from a memory in response to the address signal.

On the other hand, the object computer 3 executes the conditional branch instruction. The conditional branch instruction is an instruction which branches if a certain condition is satisfied and does not branch if the condition is not satisfied. For example, when the conditional branch instruction having a condition that it is branched if a Z (Zero) flag is up is executed, a branch occurs if the Z flag is up and a branch does not occur if the Z flag is down. If and when the conditional branch instruction was not branched as a result of execution thereof by the object computer 3, an executed result indicating signal which indicates that a branch did not occur is applied to the comparator 5. Since branch predicting information is applied to the comparator 5 from the branch predicting mechanism 4, the comparator 5 determines that both do not coincide with each other and applies a branch prediction failure signal to the next fetch instruction addressing portion 6. If the conditional branch instruction was not branched as a result of execution thereof, the next fetch instruction address portion 6 must execute the instruction in the next address a+c of the conditional branch instruction shown in FIG. 2. However, contents of the decoding program counter 62 is used to predict that the conditional branch instruction is to be branched and outputs the address signal indicating the address a+b of the destination to be branched, as described above. Thus, the next fetch instruction addressing portion 6 cancels the contents of the decoding program counter 62, reads out the original address saved in the save register 63, and loads the original address to the decoding program counter 62. In addition, the adder 61 adds an instruction length c to the contents of the decoding program counter 62 and outputs the address signal indicating the address a+c. Thus, an instruction corresponding to the address a+c is read out from a memory and executed by the object computer 3.

Although the data processor having the conventional branch predicting function is constructed as described above, the address saved in the save register 63 must be transferred to the decoding program counter 62 and the instruction length must be added to the address when the branch prediction fails, so that processing becomes complicated.

SUMMARY OF THE INVENTION

Therefore, a primary object of the present invention is to provide a data processor having a branch predicting function capable of simplifying processing in the case of the failure of branch prediction.

Briefly stated, according to the present invention, an instruction is fetched, decoded, and executed on the principle of pipeline processing. If it is predicted that the instruction will be branched as a result of branch prediction with respect to the instruction and it is determined that the instruction is a conditional branch instruction as a result of decoding thereof, processing is performed for replacing a branch displacement of the conditional branch instruction with an instruction length of the conditional branch instruction.

Therefore, in accordance with the present invention, the branch displacement and the instruction length are replaced with each other and transferred to an object computer if it is predicted that a branch will occur with respect to the conditional branch instruction, so that a branch to an instruction located next to the conditional branch instruction on the program occurs if the branch prediction fails, whereby the branch prediction and the accompanying processing are performed in a relatively simple method without requiring conventionally complicated processing.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing contents selected by selectors 12, 15 and 9 in accordance with each instruction.

DESCRIPTION OF THE PREFERRED EMBODIMENTS

Figure 3:
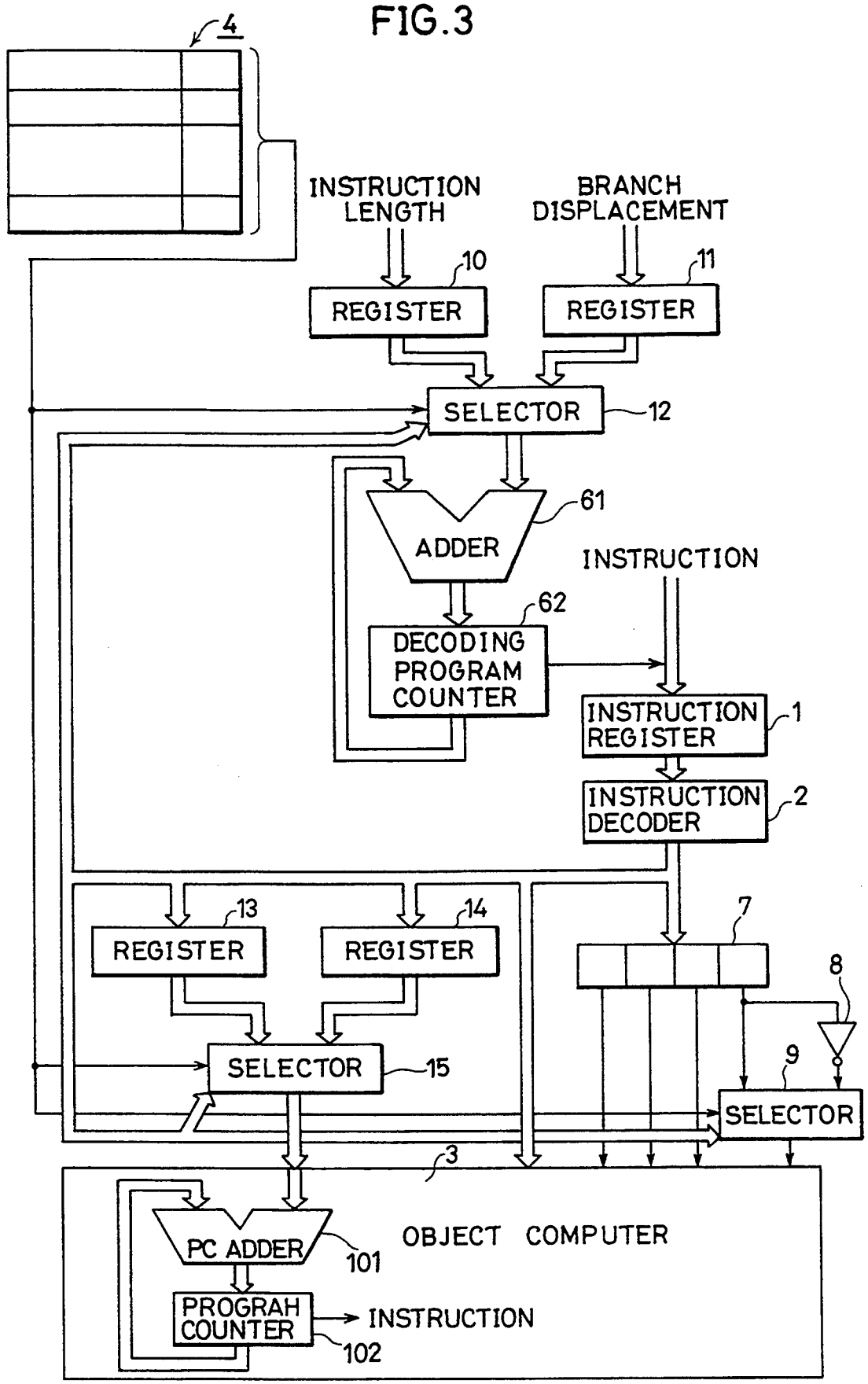
FIG. 3 is a schematic block diagram of the present invention.

One embodiment of the present invention will now be described with reference to the figures. FIG. 3 is a schematic block diagram of one embodiment of the present invention. Description will be given on a structure of the embodiment of the present invention with reference to FIG. 3.

Figure 1:
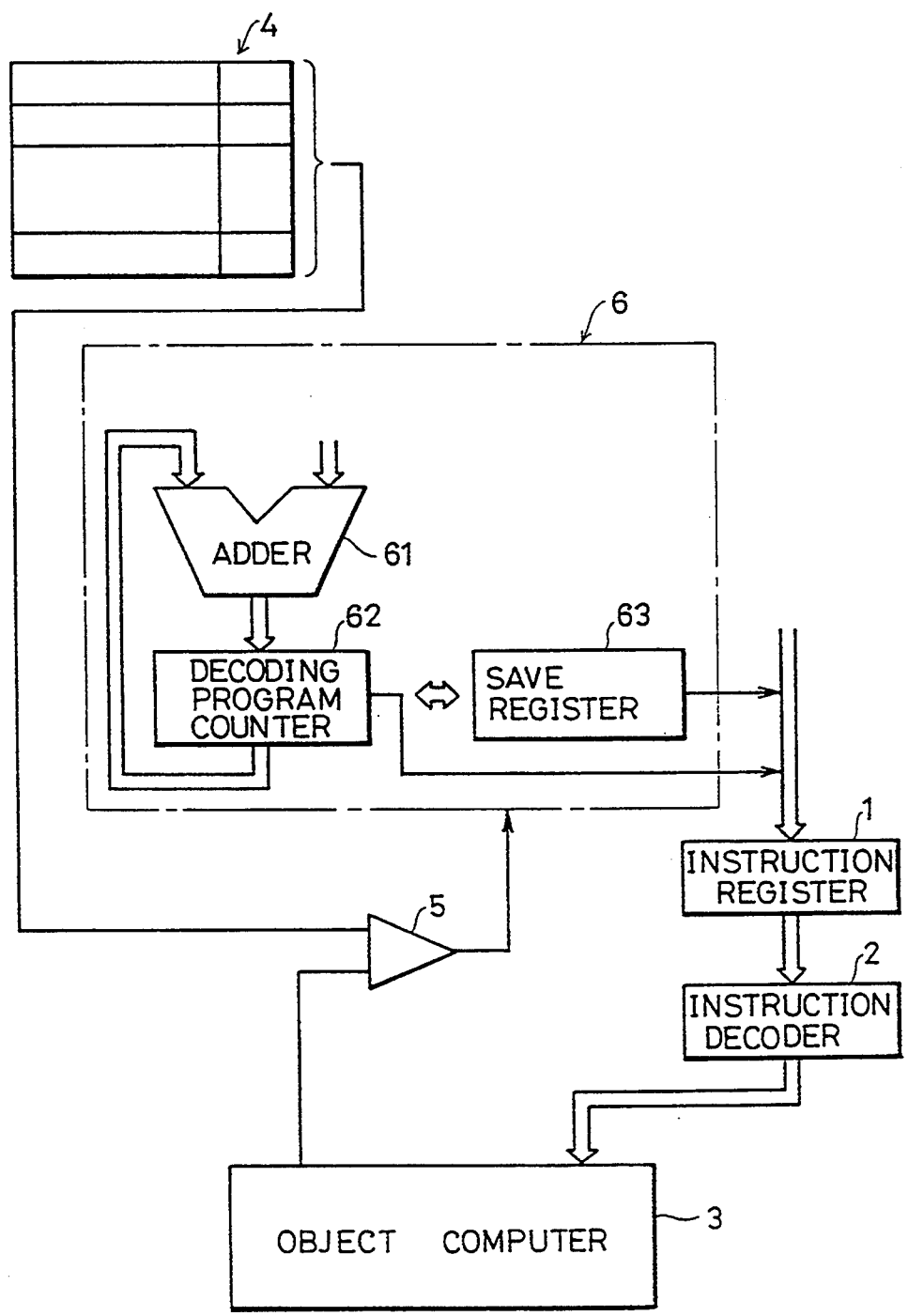
FIG. 1 is a schematic block diagram showing a data processor having a conventional branch predicting function.

Referring to FIG. 3, an instruction register 1, an instruction decoder 2, an object computer 3, an adder 61 and a decoding program counter 62 are the same as the conventional ones shown in FIG. 1. A branch predicting table 4 registers 256 branch predicting values (information of one bit) based on one branch of a conditional branch instruction in the past in correspondence with an address of the conditional branch instruction. This information of one bit or the branch predicting values is used to predict whether or not a branch occurs when the conditional branch instruction is executed.

A register 10 is loaded with an instruction code length of an instruction decoded by the instruction decoder 2. A register 11 is loaded with a branch displacement to the branch target destination of the instruction decoded by the instruction decoder 2 if the instruction is an unconditional branch instruction or a conditional branch instruction. When the instruction decoded by the instruction decoder 2 is a non-branch instruction, the contents of the register 11 is not rewritten and retains previous data.

A selector 12 selects an output of the register 10 or an output of the register 11 in response to information as to whether the branch predicting value read out of the branch predicting table 4 and the instruction decoded by the instruction decoder 2 are the non-branch instruction, unconditional branch instruction or conditional branch instruction. More specifically, in case when the non-branch instruction or the conditional branch instruction in which no branch is predicted is read out, the selector 12 selects the output of the register 10 and applies the instruction code length to the adder 61. In case when the unconditional branch instruction or the conditional branch instruction in which a branch is predicted is read out, the selector 12 selects the output of the register 11 and applies the branch displacement to the branch target destination to the adder 61.

The instruction decoder 2 has an output connected to a branch conditional code register 7 and registers 13 and 14. The branch conditional code register 7 is loaded with a branch conditional code of the conditional branch instruction decoded by the instruction decoder 2. In case when the non-branch instruction and the unconditional branch instruction are decoded, the contents of the branch conditional code register 7 is not rewritten and holds the previous data. The register 13 is loaded with the branch displacement to the branch target destination of the unconditional branch instruction and conditional branch instruction decoded by the instruction decoder 2. The register 14 is loaded with the instruction code length of the decoded instruction.

In case when the non-branch instruction is decoded, the contents of the register 13 is not rewritten and holds the previous data. Respective outputs of the registers 13 and 14 are supplied to a selector 15. The selector 15 selects the output of the register 13 or that of the register 14 in response to information as to whether the branch predicting value of the branch predicting table 4 and the instruction by the instruction decoder 2 are the non-branch instruction, unconditional branch instruction or conditional branch instruction. More specifically, if the unconditional branch instruction or the conditional branch instruction in which no branch is predicted is read out, the selector 15 selects data loaded into the register 13. If the non-branch branch instruction or the conditional branch instruction in which a branch is predicted is read out, the selector 15 selects the instruction length loaded into the register 14. The output selected by the selector 15 is added to a program counter 102 of the object computer 3 by a PC adder 101 thereof.

The branch conditional code register 7 comprises four bits, where three more significant bits indicate the branch condition and a least significant bit indicates whether a branch occurs when the branch condition is satisfied or when the branch condition is not satisfied. For example, "0000" indicates that a branch occurs when a Z (zero) flag is set, that is, the result of an operation is "0", whereas "0001" indicates that a branch occurs when the Z flag is reset, that is, the result of the operation is not "0". An output of the least significant bit of the branch conditional code register 7 is applied to a selector 9. In addition, the output is inverted by an inverter 8 and applied to the selector 9.

The selector 9 selects the least significant bit of the branch conditional code register 7 in case when the conditional branch instruction in which no branch is predicted is read out, whereas the selector 9 selects the output of the inverter and applies the output to the object computer 3 in case when the conditional branch instruction in which a branch is predicted is read out. When the instruction decoded by the instruction decoder 2 is the non-branch instruction or the unconditional branch instruction, the contents of the branch conditional code register 7 is unused and ignored by the object computer 3.

The object computer 3 comprises the PC adder 101 and the program counter 102. The program counter 102 designates an address of the instruction, and the PC adder 101 adds the instruction length selected by the selector 15 to the program counter 102.

Figure 4:
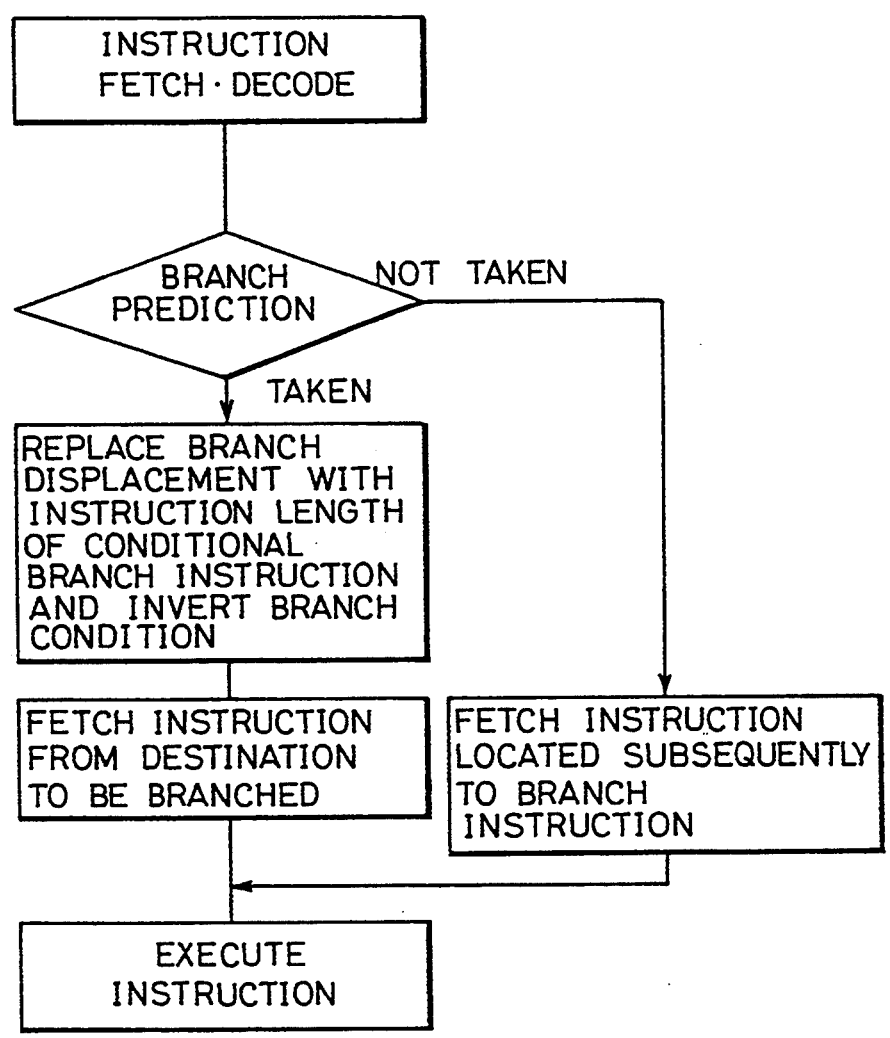
FIG. 4 is a flow chart for explaining specific operation according to an embodiment of the present invention.

FIG. 4 is a flow chart for explaining an operation of one embodiment of the present invention, and FIG. 5 is a diagram showing contents selected by the selectors 12, 15 and 9 in response to each instruction.

Figure 2:
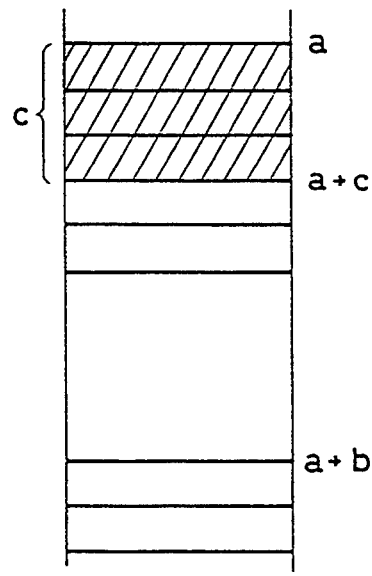
FIG. 2 is a diagram for explaining operation of the data processor shown in FIG. 1.

Description will be given of the operation of the embodiment of the present invention with reference to FIGS. 2–5. As has already been described in the description of the background art, FIG. 2 is a diagram for explaining the relation between the conditional branch instruction and address. Referring to FIG. 2, an address a is an address of the conditional branch instruction, an address a+c is an address of an instruction next to the conditional branch instruction, and an address a+b is an address of the branch target destination of the conditional branch instruction.

First, the contents of the decoding program counter 62 is outputted as an address signal to an address bus, and an instruction is read out from a certain address in a memory (not shown) and loaded into the instruction register 1. The instruction loaded into the instruction register 1 is decoded by the instruction decoder 2. An operation instructing signal is supplied to the object computer 3 and the instruction code length of the decoded instruction is loaded into the registers 10 and 14.

The object computer 3 performs an execution processing in response to the supplied operation instructing signal. At the same time, the adder 61 adds the instruction code length or the branch displacement to the branch target destination selected by the selector 12 to the contents of the decoding program counter 62, and then outputs an address signal indicating an address of the next instruction to be executed. In response to this address signal, the next instruction to be executed is read out from the memory to be loaded into the instruction register 1.

It is assumed that the conditional branch instruction is read out from the address a in the memory and then loaded into the register 1, and subsequently decoded by the instruction decoder 2. A branch predicting value corresponding to the address a of the instruction stored in the branch predicting table 4 is read out, so that a prediction is made whether the instruction is branched or not. In case when the branch predicting value indicates a branch, the selector 12 selects the output of the register 11, the selector 15 selects the output of the register 14, and the selector 9 selects the output of the inverter 8.

Since the selector 12 selects the output of the register 11, the adder 61 adds a branch displacement b to the branch target destination to the contents of the decoding program counter 62. Accordingly, an address signal indicating the address a+b of the branch target destination of the conditional branch instruction is outputted. In response to this address signal, the next instruction to be executed is read out from the branch target destination of the conditional branch instruction on the memory. If the non-branch instruction or the conditional branch instruction in which no branch is predicted is read out, an instruction code length c loaded in the register 10 is added to the contents of the decoding program counter 62 by the adder 61. If the unconditional branch instruction or the conditional branch instruction in which a branch is predicted is read out, the branch displacement b to the branch target destination loaded in the register 11 is added to the contents of the decoding program counter 62 by the adder 61.

Meanwhile, when the conditional branch instruction in which a branch is predicted is read out, the selector 15 selects the instruction code length c of the register 14. When the unconditional branch instruction or the conditional branch instruction in which no branch is predicted is read out, the selector 15 selects the output of the register 13.

In addition, it is assumed that the conditional branch instruction decoded by the instruction decoder 2 has a branch conditional code "0000". The branch conditional code "0000" of the instruction decoded by the instruction decoder 2 is loaded into the branch conditional code register 7. The three more significant bits of the branch conditional code register 7 are applied to the object computer 3, while the least significant bit is inverted by the inverter 8 to be applied via the selector 9 to the object computer 3. More specifically, the least significant bit of the branch conditional code "0000" is inverted by the inverter 8 and then applied as a branch conditional code "0001" to the object computer 3. This exhibits that a branch occurs if Z flag is down as a result of executing the operation.

The object computer 3 includes the PC adder 101 and the program counter 102. The program counter 102 designates the address a of the conditional branch instruction, and the PC adder 101 adds the instruction length c loaded into the register 14 to the program counter 102. An instruction to be executed subsequently to the conditional branch instruction is read out from the memory and loaded into the instruction register 1. In this case, a prediction is made that the conditional branch instruction will be branched, and the instruction of the address a+b on the memory is loaded in the instruction register 1. In case when the Z flag is down in the object computer 3, the conditional branch instruction having the branch conditional code "0001" and thus having the instruction code length as the branch displacement to the branch target destination is executed in the object computer 3, and hence branched into the address a+c. This means that the original prediction that a branch would occur with respect to the conditional branch instruction was wrong. Thus, the instruction located in the address a+b on the memory loaded in the instruction register 1 is cancelled, and the new instruction in the address a+c on the memory is read out and loaded into the instruction register 1.

Meanwhile, in case when the Z flag is up in the object computer 3, the conditional branch instruction having the branch conditional code "0001" is not branched even if executed in the object computer 3. This means that the original prediction that no branch would occur with respect to the conditional branch instruction was correct. Thus, the instruction located in the address a+b on the memory loaded in the instruction register 1 is effective, so that the instruction is transferred as it is to the object computer 3 and then processed therein.

If the instruction is the unconditional branch instruction as a result of decoding, the instruction is pre-fetched from the branch target destination irrespective of the branch prediction. If the instruction is the non-branch instruction as the result of decoding, the next instruction located on the program is pre-fetched irrespective of the branch prediction.

In the foregoing manner, an instruction in a correct direction can be re-fetched upon execution of the instruction even in case when the branch prediction in decoding the instruction is wrong.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data processor including a central processing unit (CPU) and memory for executing instructions including a conditional branch instruction, said data processor having a branch predicting function, comprising:
   fetching and decoding means for fetching and decoding said conditional branch instruction stored at a predetermined address in said memory and supplying an instruction length of said conditional branch instruction and a branch displacement specified by a branch displacement portion of said conditional branch instruction,
   instruction executing means for executing said conditional branch instruction decoded by said fetching and decoding means,
   branch predicting means for supplying a prediction signal indicating if said conditional branch instruction is predicted to result in taking a branch or not taking a branch,
   first replacing means responsive to said prediction signal for replacing said instruction length with said branch displacement, and
   second replacing means responsive to said prediction signal for replacing said branch displacement with said instruction length, a branch operation being executed by said instruction executing means to a destination specified by the predetermined address of said conditional branch instruction incremented by said instruction length in response to
   (i) a prediction by said predicting means of taking a branch and
   (ii) said prediction being found to be incorrect when said conditional branch instruction has been executed by said instruction executing means,
   said second radiating means including
      a first register for storing the instruction length decoded by said fetching and decoding means,
      a second register for storing the displacement decoded said fetching and decoding means, and
      first selecting means, responsive to said prediction signal for supplying the instruction length stored in said first register to said instruction executing means.

2. A data processor in accordance with claim 1, wherein
   said fetching and decoding means comprises
      an instruction register for storing said conditional branch instruction, and
      an instruction decoder for decoding the conditional branch instruction stored in said instruction register and supplying said instruction length and said branch displacement to said instruction executing means and to said replacing means.

3. A data processor in accordance with claim 1, wherein
   said branch predicting means comprises means for storing a predicting bit for predicting whether or not said conditional branch instruction will result in execution of a branch operation.

4. A data processor in accordance with claim 1, further comprising:
   address counting means for counting addresses to address a next instruction, and
   adder means receiving an address value from said address counting means and adding to said address value said displacement selected by said first selecting means to form a next instruction address and supplying said next instruction address to said address counting means.

5. A data processor in accordance with claim 1, wherein
   said first selecting means comprises means responsive to said prediction signal for supplying the instruction length stored in said first register when no branch is predicted by said branch predicting means.

6. A data processor in accordance with claim 1, wherein
said second replacing mean comprises
a third register for storing the instruction length decoded by said fetching and decoding means,
a fourth register for storing the displacement decoded by said fetching and decoding means, and
second selecting means responsive to said prediction signal for selecting the displacement stored in said fourth register.

7. A data processor in accordance with claim 6, wherein
said second selecting means comprises means responsive to said prediction signal for supplying the displacement stored in said fourth register to said instruction executing means when no branch is predicted by said branch predicting means.

8. A data processor in accordance with claim 1, wherein
said second replacing means comprises branch condition changing means for changing a branch condition of said conditional branch instruction, in response to said prediction signal.

9. A data processor in accordance with claim 8, wherein
said second replacing means comprises inverter means for inverting a true branch condition bit signal of said conditional branch instruction to generate an inverted branch condition bit signal and a selector means for selecting one of said true branch condition bit signal and said inverted branch condition bit signal in response to said prediction signal.

10. A data processor in accordance with claim 1, wherein said second replacing means forms a modified instruction and supplies said modified instruction to said instruction executing means.

11. A data processor in accordance with claim 1, wherein
said first replacing means includes a first register for storing said instruction length and a second register for storing said branch displacement; and
said first replacing means providing an address of the next instruction to be executed by
(a) using said branch displacement stored in said second register when said conditional branch instruction is correctly predicted to result in taking a branch,
(b) using said instruction length stored in said first register when said conditional branch instruction is correctly predicted to result in not taking a branch, said second replacing means providing an address of a next instruction to be executed,
(c) using said instruction length stored in said fourth register when said conditional branch instruction is incorrectly predicted to result in taking a branch, and
(d) using said branch displacement stored in said third register when said conditional branch instruction is incorrectly predicted to result in not taking a branch.

12. A data processor in accordance with claim 1, wherein
said first replacing means includes a first register storing said instruction length and a second register storing said branch displacement; and
said first replacing means supplying an address of a next instruction to be executed responsive to said branch prediction signal from said branch predicting means and to the execution of a branching operation by said instruction execution means, said address of said next instruction being selectively retrieved from
(a) said second register when said conditional branch instruction is correctly predicted to result in taking a branch,
(b) said first register when said conditional branch is correctly predicted to result in not taking a branch,
(c) said fourth register when said conditional branch is incorrectly predicted to result in taking a branch, and
(d) said third register when said conditional branch instructions is incorrectly predicted to result in not taking a branch.

13. A data processor for executing instructions including a conditional branch instruction, said data processor having a branch predicting function, comprising:
fetching and decoding means for fetching and decoding said conditional branch instruction stored at a predetermined address and supplying an instruction length of said conditional branch instruction and a branch displacement specified by a branch displacement portion of said conditional branch instruction,
instruction executing means for executing said conditional branch instruction decoded by said fetching and decoding means,
branch predicting means responsive to said predetermined address of said conditional branch instruction for supplying a prediction signal indicating if said conditional branch instruction is predicted to result in taking a branch, and
replacing means responsive to said prediction signal for replacing said branch displacement with said instruction length to form a modified instruction and supplying said modified instruction to said instruction executing means, a branch operation being executed by said instruction executing means to a destination specified by the predetermined address of said conditional branch instruction incremented by said instruction length in response to (i) a prediction by said predicting means of taking a branch and (ii) said prediction being found to be incorrect when said conditional branch instruction has been executed by said instruction executing means.

14. A data processor for executing a series of instructions stored in a plurality of memory addresses, said instructions including a conditional branch instruction having instruction code data and branch offset data, said data processor comprising:
a decode address register for storing a current address of said conditional branch instruction currently decoded and responsive to an increment value for supplying a next address of an instruction to be decoded;
branch predicting means responsive to said current address of said conditional branch instruction currently decoded for supplying a branch prediction signal;
a first selector responsive to said branch prediction signal for selectively supplying to said decode address register as said increment value (i) an instruction length of said conditional branch instruction currently decoded in response to a prediction that no-branch will result and (ii) said branch offset data of said conditional branch instruction currently decoded in response to a prediction that a branch will result;

an instruction register responsive to said current address of said conditional branch instruction currently decoded for storing a current instruction to be decoded;

an instruction decoder responsive to said current instruction to be decoded for supplying (i) a plurality of condition code bit signals and (ii) a branch-/no-branch on condition bit signal;

a central processor including
(i) a program counter register for storing an address of an instruction to be executed,
(ii) program counter incrementing means responsive to said address of said instruction to be executed and to a program counter increment value for storing in said program counter register an address of an instruction to be next executed, and
(iii) branching means responsive to said plurality of condition code bit signals and said branch/no-branch on condition bit signal for storing a branch address in said program counter register as said address of an instruction to be next executed;

a second selector responsive to said branch prediction signal for selectively supplying to said central processor as said program counter increment value (i) an instruction length of said conditional branch instruction currently decoded in response to a prediction that a branch will result and (ii) said branch offset data of said conditional branch instruction currently decoded in response to a prediction that no-branch will result; and inverter means for selectively inverting said branch-/no-branch on condition signal in response to said branch prediction signal and supplying said selectively inverted branch/no-branch on condition signal to said branching means of said central processor.

* * * * *